Dec. 22, 1925.
P. TROMBETTA
1,566,936
ELECTRIC POWER SYSTEM
Filed March 19, 1924
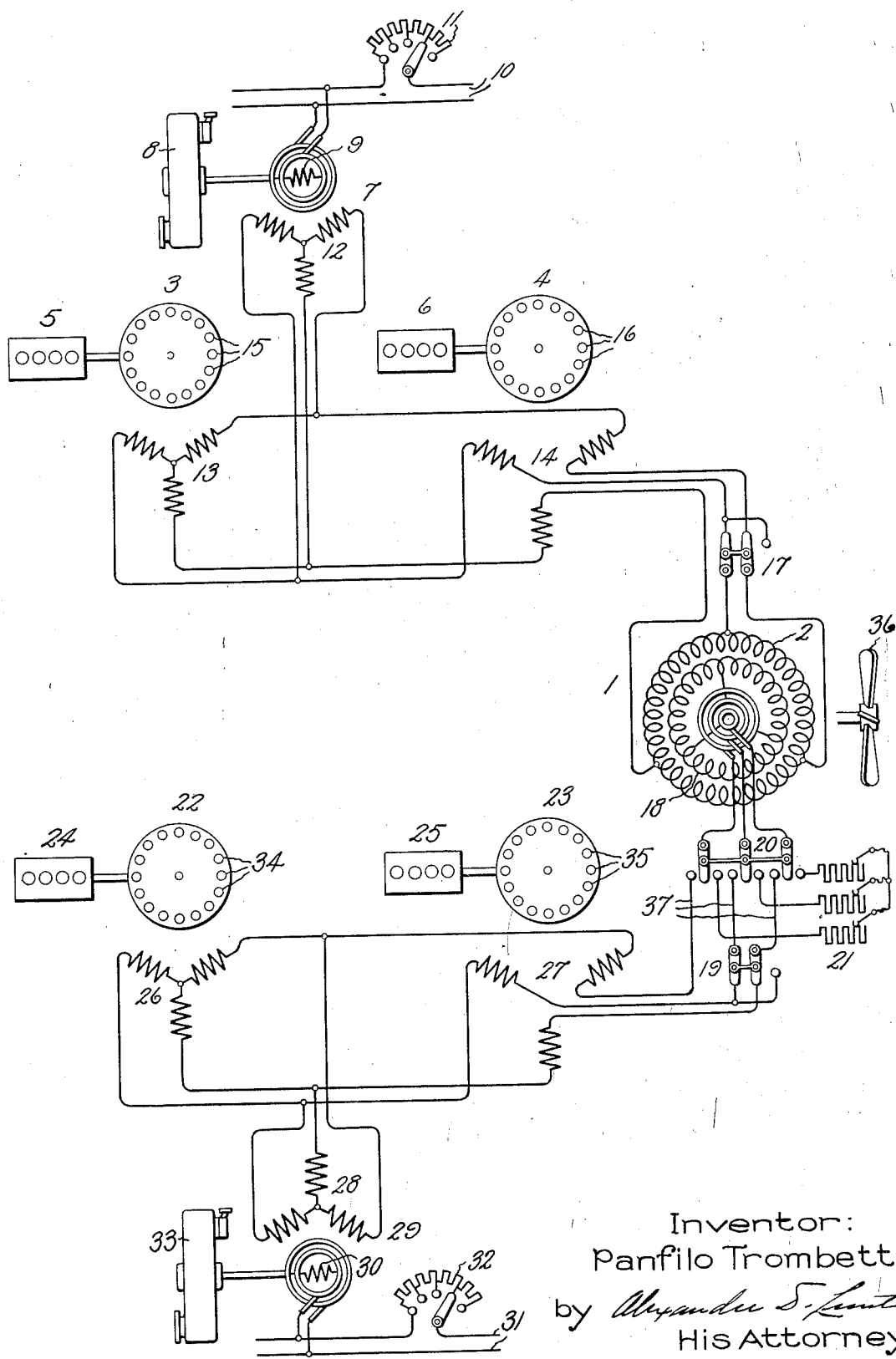
Inventor:
Panfilo Trombetta,
by Alexander S. Lunt
His Attorney.

Patented Dec. 22, 1925.

1,566,936

UNITED STATES PATENT OFFICE.

PANFILO TROMBETTA, OF SCHENECTADY, NEW YORK, ASSIGNOR TO GENERAL ELECTRIC COMPANY, A CORPORATION OF NEW YORK.

ELECTRIC POWER SYSTEM.

Application filed March 19, 1924. Serial No. 700,436.

*To all whom it may concern:*

Be it known that I, PANFILO TROMBETTA, a citizen of the United States, residing at Schenectady, in the county of Schenectady, State of New York, have invented certain new and useful Improvements in Electric Power Systems, of which the following is a specification.

My invention relates to electric power systems, and has for its object the provision of an improved alternating current system wherein power is supplied to a load device, such as the propeller motor of a ship for example, from a plurality of generators driven by independent prime movers.

The Diesel engine has the advantage of high efficiency and for this reason has been extensively used as a means of driving direct current generators connected in series to one or more load motors. This arrangement furnishes ideal condition for the control of the motor torque and speed, and the connection of the generators in series permits variation in the speed and torque of the various engines without appreciable effect on the operation of the load motor or motors. It is highly desirable to develop a similar alternating current system which retains these good features and at the same time makes it possible to secure the advantages of alternating current apparatus which, as compared with direct current apparatus, is lighter in weight, has higher efficiency, and does not require the use of commutators. Due to its inherent speed characteristics, however, the Diesel engine is unsuited for driving synchronous alternating current generators which are likely to hunt or produce currents which circulate between the various generators without the production of useful torque. In accordance with my invention this difficulty is avoided and the advantages of both direct and alternating current apparatus are retained by the use of induction generators driven by prime movers which may have the varying torque characteristics of internal combustion engines.

My invention will be better understood from the following description when considered in connection with the accompanying drawing, and its scope will be pointed out in the appended claims.

The single figure of the drawing shows a ship propulsion system wherein a double fed propeller motor 1 is arranged to have its stator winding 2 interconnected with a machine group or aggregate comprising induction generators 3 and 4 which are arranged to be driven by prime movers 5 and 6 respectively and a synchronous machine 7 arranged to be driven by an adjustable speed prime mover such as a steam turbine 8, for example. The synchronous machine 7, which is provided for supplying the excitation required by generators 3 and 4 and a part of that required by the motor 1, is provided with a field winding 9 arranged to be supplied with current through leads 10 and adjustable rheostat 11. The armature winding 12 of the machine 7 is conductively associated with the series connected windings 13 and 14 of the generators 3 and 4 respectively through which current is supplied to the stator winding 2 of the motor 1. The rotor members of the generators 3 and 4 are shown as provided with squirrel cage winding 15 and 16 respectively. A reversing switch 17 is provided in the leads through which current is supplied to the motor winding 2.

A machine aggregate similar to the one just described is interconnected with the rotor winding 18 of the motor 1 through reversing switch 19 and switch 20 which is also arranged to connect the winding 18 to the adjustable rheostat 21 for purpose explained hereinafter. This machine aggregate comprises generators 22 and 23 driven by prime movers 24 and 25 respectively and provided with armature windings 26 and 27 interconnected with the armature winding 28 of a synchronous machine 29. The machine 29 is provided with a field winding 30 adapted to be supplied with current through leads 31 and adjustable rheostat 32. An adjustable speed prime mover 33 is coupled to the rotor of the machine 29. The rotor members of the generators 22 and 23 are provided with windings 34 and 35 respectively. A propeller 36 is adapted to be driven by the motor 1.

Assuming the switch 17 to be closed and the switch 20 to be open, the following procedure may be followed in bringing the motor 1 up to speed. The generator 3 may be brought up to a suitable speed, one-half normal speed, for example, and supplied with excitation from the machine 7. The generator 4 will thereupon start as an induction motor and may be driven as a generator by supplying fuel to its prime mover 6 when it has come up to substantially the same speed as the generator 3. The generators 3 and 4 now supply current to the winding 2 at a frequency determined by the speed of the synchronous machine 7 and the motor 1 may be started as an induction motor by operating the switch 20 to connect its winding 18 to the rheostat 21 which is utilized to accelerate the motor in a manner well known to those skilled in the art.

Assuming that the generators 22 and 23 to have been accelerated as described in connection with generators 3 and 4, and the machine 29 to be supplying exciting current at the low frequency of two or three cycles per second, for example, the speed of the motor 1 may be further increased by operating the switch 20 to connect the winding 18 to the leads 37 instead of the rheostat 21 and closing the reversing switch 19 in a position to produce through the winding 18 a magnetic field rotating in a direction opposite to that produced through the winding 2. It will be apparent that in this method of procedure the synchronizing force exerted between the oppositely rotating fields is relied upon to raise the motor speed from a value slightly below to a value slightly above that at which its stator field is rotating. If desired this force may be increased by reducing the speed of the machine 7 at the instant that the switch 19 is closed to supply current to the winding 18. When its rotor and stator fields are in step the speed of the motor may be further increased by bringing the generators 3, 4, 22 and 23 up to full speed and increasing the frequency of the exciting currents supplied by the machines 7 and 29.

The motor 1 may be brought to rest and started to rotate in the opposite direction by opening the switch 19, operating the switch 20 to connect the winding 18 to the rheostat 21 and reversing the phase rotation of the winding 2 by means of switch 17 to cause the stator field of the motor to rotate in a direction the reverse of that in which the winding 18 is driven by the propeller. If desired the frequency of the current supplied to the winding 2 may be reduced to improve the motor torque characteristics during this stage of the operation. Under these conditions the motor will come to rest and will accelerate in the reverse direction to a speed dependent upon the frequency of the current delivered by the generators 3 and 4. To increase further the motor speed the winding 18 may be connected to the generators 22 and 23 with a phase rotation opposite to that of the winding 2 and the steps followed in accelerating the motor from rest may be followed. This part of the operation has been described in connection with the operation of starting the motor and will be understood without detailed explanation.

If the stator and rotor fields of the motor 1 be made to rotate in opposite directions as previously indicated it will be apparent that motor speed is directly proportional to the sum of the frequencies of its stator and rotor currents. The rotor and stator fields may also be caused to rotate in the same direction. When this relation exists the speed of the motor is proportional to the difference between the frequencies of the stator and rotor currents and the motor is at rest when these two fields are rotating at the same rate of speed. This arrangement has the advantage that the frequencies of the stator and rotor currents may be made fairly high without requiring an excessive number of poles on the motor to maintain its speed within proper limits. The operation of this arrangement will be readily understood. Assuming the two fields to be rotating at the same speed, the motor may be started from rest in one direction by decreasing the frequency of the rotor current or may be accelerated in the opposite direction by decreasing the frequency of the stator current. In either case the motor is brought to rest by equalizing the rotational speeds of its rotor and stator fields.

By combining the induction generator with the Diesel engine certain advantages of both are retained while certain of their objectionable features are eliminated. The induction generator, when operated in connection with a system having its frequency fixed independently of the generator, will assume a speed just high enough to supply all the power that it has available. Since the generators will supply to the system as much power as they can without changing its frequency, the question of their speed control becomes a consideration of minor importance. Therefore, the engines 5 and 6, for example, are independent of each other and their speeds may vary over a considerable range without affecting the frequency of the system or overloading the generators. There is thus no tendency for the generators to hunt and the production of circulating currents are avoided.

While my invention has been illustrated as embodied in a form which now seems preferable, it will be apparent that the synchronous machines will function to supply the exciting current of the induction machines whether they be connected in series or in parallel therewith.

It will be apparent to those skilled in the art that changes may be made in the embodiment disclosed without departing from my invention. The terms of the appended claims are, accordingly, not restricted to the precise arrangement shown but are intended to cover all changes and modifications within the spirit and scope of my invention.

What I claim as new and desire to secure by Letters Patent of the United States, is:—

1. An electric power system comprising a load device and a machine aggregate for supplying current to said load device, said aggregate including a plurality of series connected induction generators, a plurality of independent internal combustion engines for driving said generators, and means for controlling the frequency of the current delivered by said generators.

2. An electric ship propulsion system comprising a motor having a pair of windings, a machine aggregate for supplying current to one of said windings and a second machine aggregate for supplying current to the other of said windings, said aggregates each including a plurality of interconnected induction generators, a plurality of independent internal combustion engines for driving said generators, and means for supplying the excitation of said generators.

3. An electric power system comprising a load device and a machine aggregate for supplying current to said load device, said aggregate including a plurality of series connected induction generators, independent prime movers for driving said generators, and means for controlling the frequency of the current delivered to said load device.

In witness whereof, I have hereunto set my hand this 18th day of March 1924.

PANFILO TROMBETTA.